US010220798B2

(12) United States Patent
Lowell

(10) Patent No.: US 10,220,798 B2
(45) Date of Patent: Mar. 5, 2019

(54) SELF LEVELING STEERING WHEEL MOUNT ASSEMBLY FOR ELECTRONIC CELL PHONE DEVICE HAVING SIDE CAMERA

(71) Applicant: Thomas A. Lowell, Talent, OR (US)

(72) Inventor: Thomas A. Lowell, Talent, OR (US)

(*) Notice: Subject to any disclaimer, the term of this patent is extended or adjusted under 35 U.S.C. 154(b) by 53 days.

(21) Appl. No.: 15/715,135

(22) Filed: Sep. 25, 2017

(65) Prior Publication Data
US 2018/0022292 A1 Jan. 25, 2018

Related U.S. Application Data

(60) Provisional application No. 62/523,173, filed on Jun. 21, 2017.

(51) Int. Cl.
B60R 11/02 (2006.01)
H04M 1/02 (2006.01)
G06F 1/16 (2006.01)
B60R 11/00 (2006.01)
H04M 1/04 (2006.01)
H04M 1/60 (2006.01)

(52) U.S. Cl.
CPC .......... B60R 11/0241 (2013.01); B60R 11/02 (2013.01); B60R 11/0252 (2013.01); G06F 1/1686 (2013.01); H04M 1/0264 (2013.01); B60R 11/0264 (2013.01); B60R 2011/001 (2013.01); B60R 2011/0063 (2013.01); H04M 1/04 (2013.01); H04M 1/6075 (2013.01)

(58) Field of Classification Search
CPC ............ B60R 11/0241; B60R 11/0252; G06F 1/1686; H04M 1/0264

USPC ........................................................ 224/276
See application file for complete search history.

(56) References Cited

U.S. PATENT DOCUMENTS

| 1,573,447 | A | * | 2/1926 | Prewitt | B60R 7/081 224/276 |
|---|---|---|---|---|---|
| 2,918,202 | A | * | 12/1959 | Constantine | B62D 1/16 224/276 |
| 5,193,777 | A | * | 3/1993 | Faulstich | B60N 3/005 108/44 |
| 5,489,121 | A | * | 2/1996 | Mohr | B42D 17/00 108/44 |
| 6,786,372 | B2 | * | 9/2004 | Enkerlin | A45F 5/02 224/196 |
| 8,496,144 | B2 | * | 7/2013 | Son | B60R 11/02 224/276 |
| 8,505,792 | B1 | * | 8/2013 | Jansen | B60R 11/0241 224/276 |
| 9,616,822 | B1 | * | 4/2017 | Hamilton | B60R 11/0241 |
| 9,667,761 | B2 | * | 5/2017 | Barkan | H04M 1/0254 |
| 9,685,060 | B2 | * | 6/2017 | Mantsvetov | G08B 21/02 |
| 9,821,725 | B2 | * | 11/2017 | Tyrer | B60R 11/02 |

(Continued)

Primary Examiner — Nathan J Newhouse
Assistant Examiner — Lester L Vanterpool
(74) Attorney, Agent, or Firm — Nicholas J. Aquilino

(57) ABSTRACT

A combination of a vehicle including a steering wheel assembly and an electronic cell phone device having a side positioned camera and a mounting system that enables said cell phone device to be mounted on said steering wheel assembly. The camera faces at least one front seat side window of the vehicle allowing handsfree recording and uploading to cloud storage of events inside and outside the vehicle without the necessity of the driver positioning the camera at the area being recorded.

15 Claims, 12 Drawing Sheets

(56) References Cited

U.S. PATENT DOCUMENTS

| | | | |
|---|---|---|---|
| 2007/0029359 A1* | 2/2007 | Smith | B60R 11/02 224/276 |
| 2008/0207276 A1* | 8/2008 | Burrell | B60R 11/0241 455/573 |
| 2011/0024470 A1* | 2/2011 | Hajarian | B60R 11/0241 224/276 |
| 2012/0080465 A1* | 4/2012 | Son | B60R 11/02 224/276 |
| 2012/0223196 A1* | 9/2012 | Musselman | B60R 11/02 248/220.21 |
| 2014/0008405 A1* | 1/2014 | Beaver | B60R 11/0241 224/276 |
| 2015/0144754 A1* | 5/2015 | Elharar | B60R 11/0241 248/230.8 |
| 2015/0217701 A1* | 8/2015 | Tyrer | B60R 11/02 224/276 |

\* cited by examiner

SELF LEVELING STEERING WHEEL MOUNT ASSEMBLY FOR ELECTRONIC CELL PHONE DEVICE HAVING SIDE CAMERA

PRIORITY APPLICATIONS

Applicant claims priority of the filing date of provisional application titled NO SPIN STEERING WHEEL AND BELT ATTACHMENT DEVICE INCLUDING A STATIONARY SUPPORT/CHARGING WAND filed Jun. 21, 2017, Application No. 62/523,173.

FIELD OF THE INVENTION

The present invention relates to a self-leveling, hands free mounting device for a vehicle steering wheel, a mounting apparatus therefor and an electronic cell phone including a side facing camera to video record events inside and outside the vehicle.

BACKGROUND OF THE INVENTION

The use of electronic devices, such as cell phones, Global Positioning Systems, or dashboard and rear view mirror cameras, by the driver of a vehicle has become commonplace in modern society. Typically use of this equipment is driver distracting particularly if the electronic device is required to be hand held or operated by the driver. These types of distractions are particularly dangerous and have been known to cause serious accidents. Even when mounting structures are provided on or above the dashboard, the driver typically must remove the hands from the steering wheel and/or remove the eyes from the road to engage the electronic device thereby diverting attention from the task of safely driving the vehicle. In the case of a traffic stop by law enforcement, the typical dash cam's lack of connectivity to cloud storage limits the security of the video recorded data from confiscation or destruction by rogue law enforcement officers, whereas the cell phone's cloud connectivity removes this issue, making it the preferred choice within this context.

It has been recognized that mounting of an electronic device on the steering wheel of the vehicle provides easy access to the driver whereby the device is visually available requires a minimum use of the drivers hands while driving and in the case of the cell phone, provides connectivity to the cloud for uploading of data as needed. For example, U.S. Pat. No. 6,305,217 shows a cell phone mounted on the steering wheel of the vehicle, however the cell phone holder is permanently attached whereby the cell phone rotates with the wheel as it is turned making it difficult to view and causing a potential distraction to the driver.

An improved mounting device for a cell phone is shown in Application Number 2011/0024470 to Hajarian that discloses a cell phone mount on the center console of a typical steering wheel assembly that includes a rotatable platform mounted on the steering wheel to which the cell phone is attached. This structure maintains the cell phone mount vertical and in essentially the same position on the steering wheel. However, the apparatus to achieve this result is complex and subject to malfunction because of the precise movements of the relatively moving parts to achieve the intended purpose.

Another patent of interest is U.S. Pat. No. 2,150,709 to Bake that shows a clipboard mounted on a steering wheel and the clipboard rotates with the wheel as it is turned.

U.S. Pat. No. 6,328,271 to Haage relates to a phone holder with a three-point fastener.

Application Number 2007/0029359 to Smith shows a bracket mount for a cell phone that also rotates with the wheel.

US application 2003/0081942 relates to a video recorder for a vehicle.

US application 2004/0008255 discloses another vehicle recording system of interest.

US application 2013/0044257 shows a cell phone with a side mounted camera.

US application 2007/0206087 shows a cell phone with a top edge mounted camera.

US application 2015/0085184 shows another cell phone with a side edge mounted camera.

None of the above listed prior art references shows the mounting of a side facing camera equipped cell phone on a steering wheel assembly, either with or without an assembly that keeps the cell phone substantially vertical regardless of the rotational position of the steering wheel.

SUMMARY OF THE INVENTION

The present invention relates to the combination of a vehicle steering wheel assembly, including a steering wheel and a center hub attached to a steering column that the steering wheel rotates around during normal steering operations while driving the vehicle. The combination includes a cell phone electronic device having side facing cameras on both the sides of the cell phone for monitoring activity inside and outside of and adjacent to the vehicle. A mounting assembly attached to the vehicle steering wheel for mounting the cell phone electronic device allows the device to be self-leveling when me steering wheel is turned by the driver, thereby maintaining the camera in a photo ready position without the necessity of interaction by the driver.

The cell phone electronic device is a conventional cell phone structure generally rectangular in shape having a thickness sufficient to encapsulate the components of the cell phone. In a normal upright position, the cell phone is formed with a top and bottom edge and side edges. In a preferred embodiment, at least one camera, and preferably two cameras, are included in the cell phone having a camera lens mounted on and facing outwardly from opposite side edges of the cell phone. When the cell phone is mounted on the steering wheel assembly with the front side of the cell phone facing the driver, the cameras positioned on the side of the cell phone face both front seat side windows of the vehicle and are capable of photographing or videoing activity both inside and outside and in close proximity of the vehicle without having to be hand held by the driver during the recording process. This structural combination is particularly useful in the event a person approaches the vehicle and interacts with the driver such as would occur when a law officer attempts to engage the driver based on an alleged violation.

In another preferred embodiment, both sides of the cell phone are provided with side facing cameras such that activity at either the driver's side front window or the passenger side front seat side window of the vehicle can be recorded.

The mounting assembly is simple in design, uses fewer parts and is easier to use than some of the prior art apparatus for accomplishing the same result. The mounting assembly maintains the cell phone in a vertical position where it is easy to see and use and also maintains the cell phone in precisely the same position at the center of the steering wheel console using a minimum number of easily interconnected parts. The mounting assembly is a quick release system using a mounting stud attached to the steering wheel hub or similar mounting platform that forms a part of the steering wheel assembly. The cell phone electronic device is provided with an attached clip that engages the stud and is freely rotatable on it. The mounting assembly provides a convenient, close proximity location, resulting in minimum use of the drivers hands allowing the driver's maximum attention to the road during the more important task of driving the vehicle, as well as unobtrusive access to activate the record function of the cameras when the vehicle is stopped.

In the preferred embodiments, the clip is permanently attached to the electronic device and may be used to mount the device on the belt of the user or any other suitable mounting structure when not mounted on the steering wheel.

This arrangement is almost entirely motionless whereby an electronic device mounted with the mounting assembly is able to hang in a vertical position regardless of the position of the steering wheel.

A preferred embodiment of the invention uses a stabilizing support wand and cell phone charging cable that both stabilize the position of the cell phone and allow the cell phone to be mounted substantially above the center of rotation of the steering wheel. This higher position keeps the cell phone in the driver's normal forward looking field of view thereby eliminating any need for the driver's eyes to be away from the road. The higher mounting position also enables the cameras to capture a relatively distortion free video recording from a drivers visual perspective.

In another preferred embodiment of the invention, the mounting assembly includes a safety strap connected between the steering wheel rim and/or wheel spoke and the mounting stud to tether the cell phone and the mounting assembly limiting any projection toward the driver by the length of the strap and thereby preventing injury to the driver in the event of an accident where the airbag deploys.

A primary object of the present invention is the provision of a cell phone having side facing cameras and a mounting assembly therefor that enables the cell phone to be vertically positioned on the steering wheel assembly regardless of the rotational position of the wheel to enable recording and uploading to cloud storage of events inside and outside the vehicle's front seat side windows without the necessity of the driver holding the camera in position.

Another object of the present invention is the provision of a driver being able to hands free video record views and events in the direction of the driver side window and/or the passenger side window A further object of the present invention is to position the cell phone in a driver's normal field of vision while keeping the driver's eyes focused on the road.

Another object is the provision of a steering wheel mounting assembly including a safety strap that maintains the mounting assembly and device being mounted connected to the steering wheel in the event of an air bag deployment.

These and other objects will be apparent with reference to the following specification and accompanying drawings.

DESCRIPTION OF THE PREFERRED EMBODIMENTS

Figure 1:
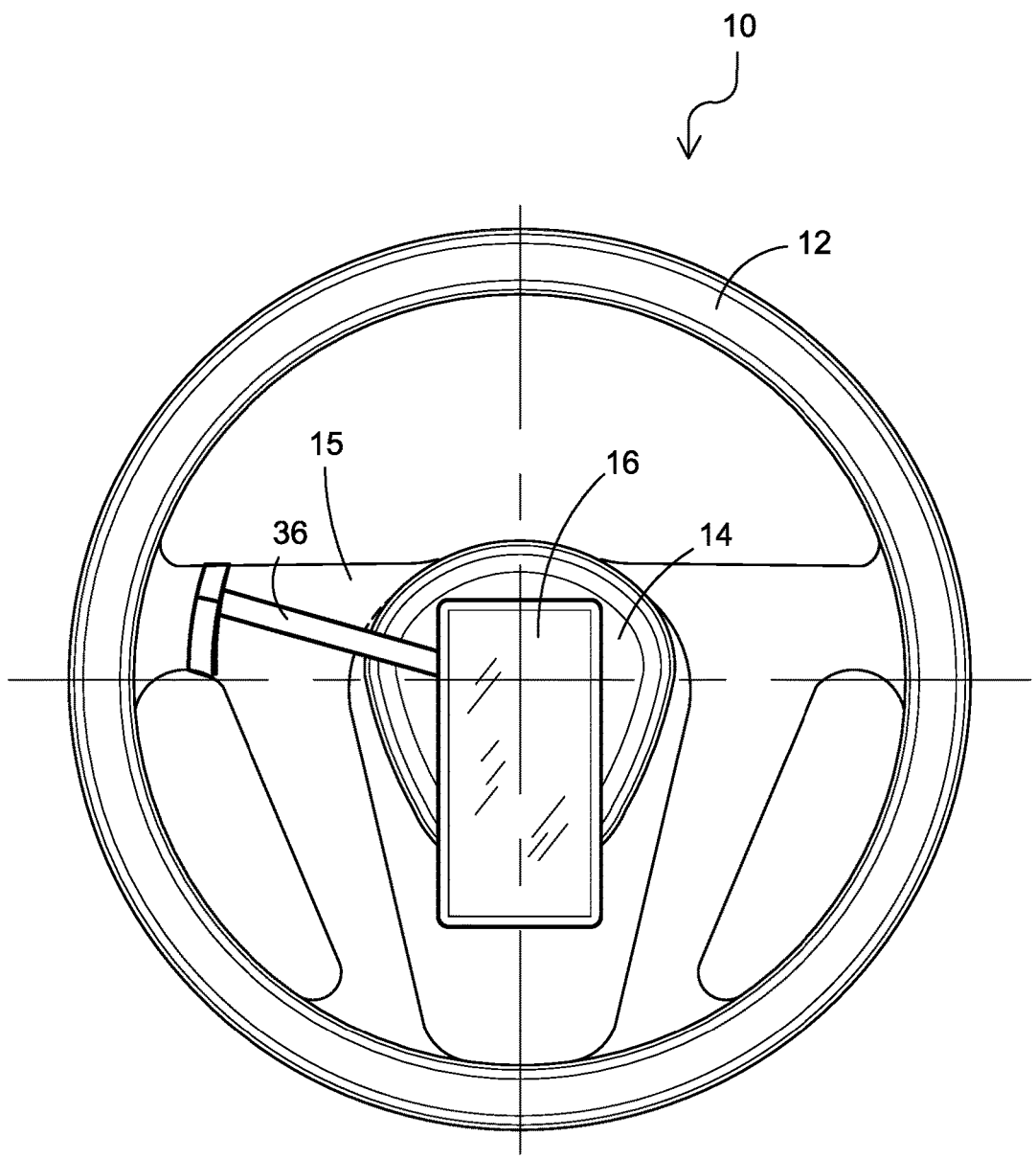
FIG. 1 is a frontal view of a cell phone device mounted on a steering wheel assembly.

FIGS. 1-4 show a conventional steering wheel assembly 10 including a steering wheel rim 12, a center hub 14 and spokes 15 connecting the rim 12 to the center hub 14. It will be appreciated that not all steering wheels are perfectly round and may not be located precisely equidistant from the center of rotation of the steering column 35. A cell phone type electronic device 18 or smartphone having side mounted cameras 18 and 20 facing the driver side front window and the passenger side front window so that activity within a field of view of each camera inside and outside of the vehicle may be recorded while the cell phone 18 is mounted on the steering wheel center hub 14 without the necessity of it being hand held by the vehicle driver.

Figure 2:
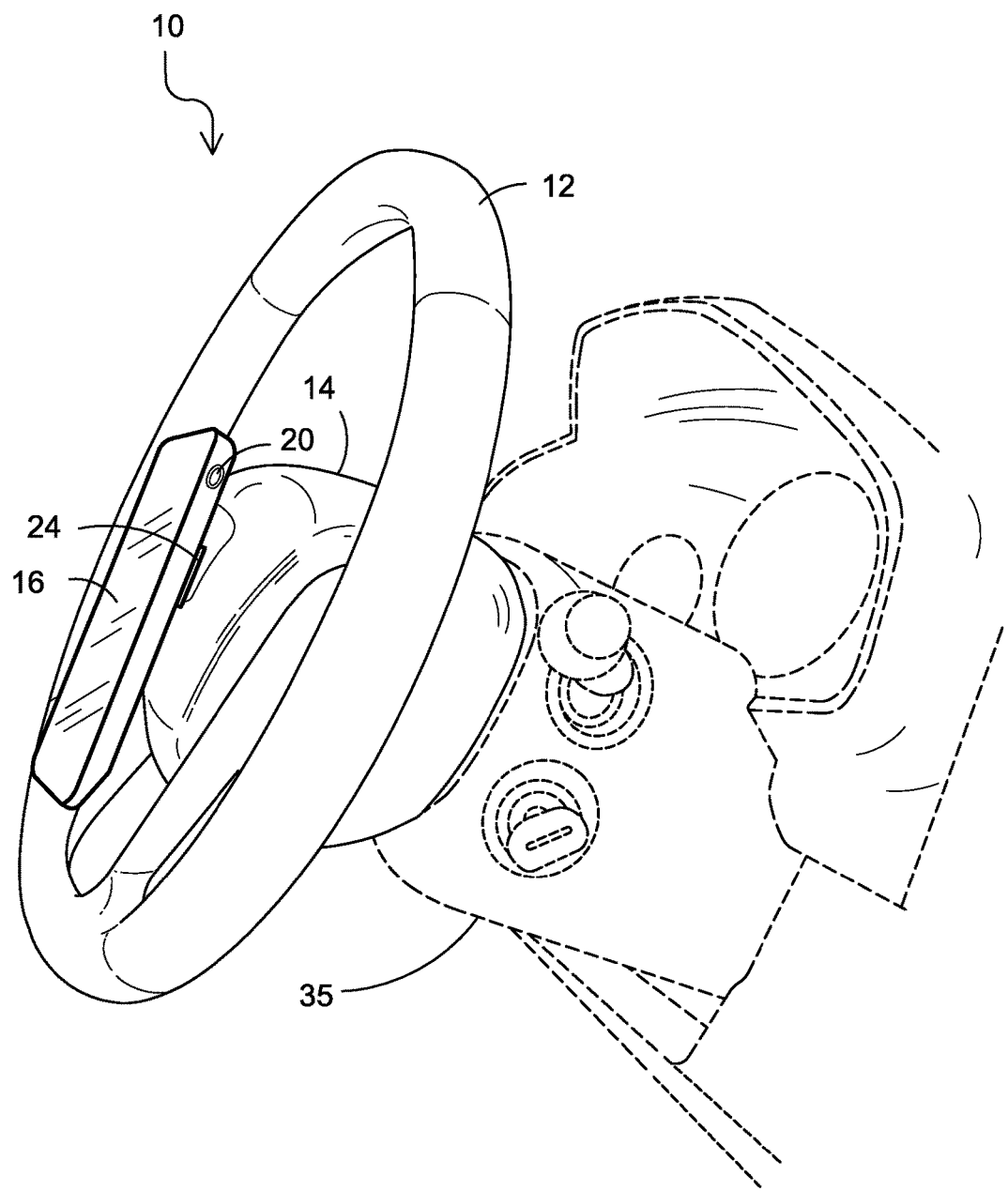
FIG. 2 is a right side perspective view of FIG. 1.
Figure 3:
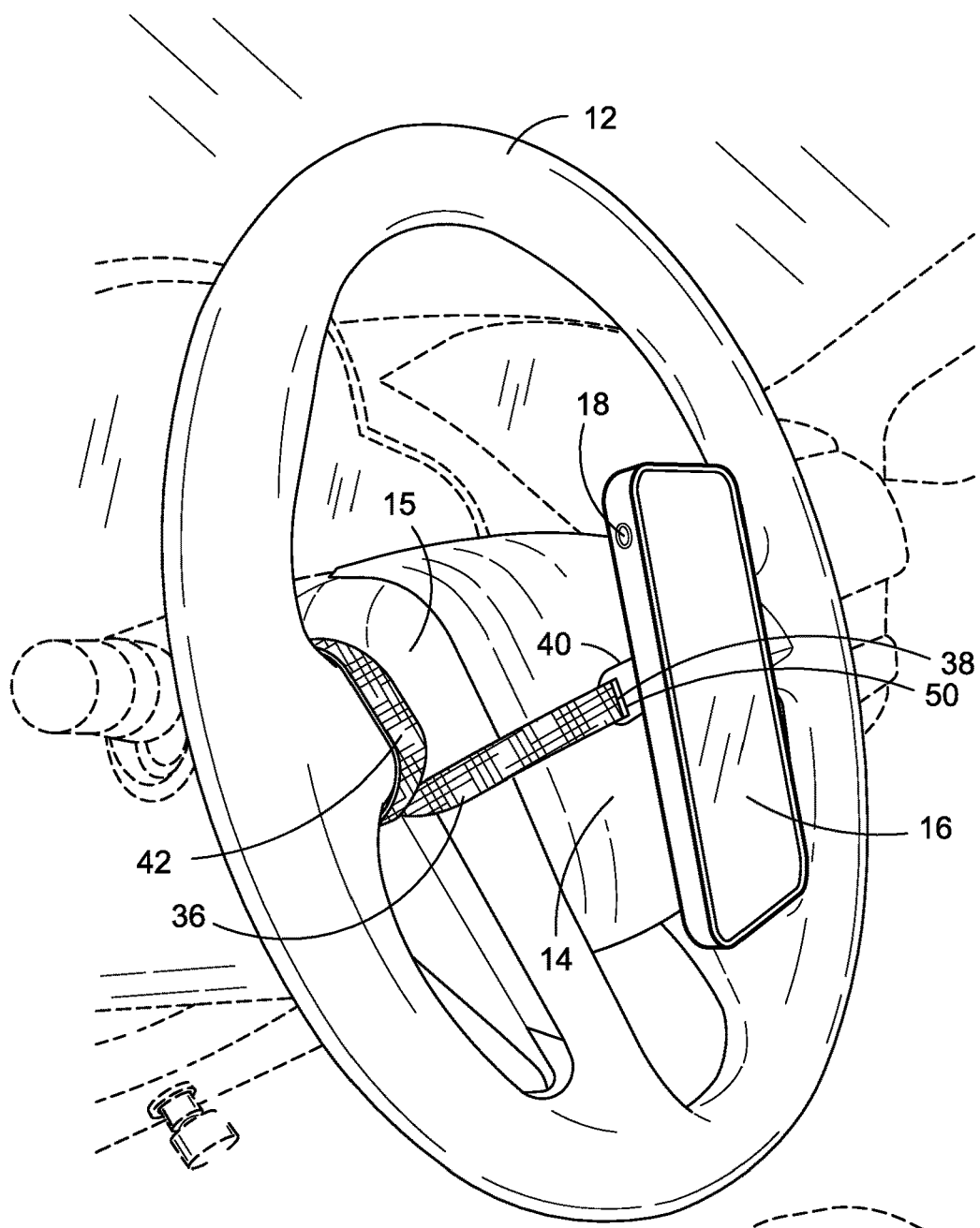
FIG. 3 is a left side perspective view of FIG. 1.

FIG. 2 shows the cell phone type electronic device 16 having a side mounted camera 20 facing the passenger side window. FIG. 3 shows the cell phone electronic device 16 with a camera 18 facing the drivers side front window. The cell phone 16 is mounted to the center hub 14 of the steering wheel assembly 10 that allows the cell phone 16 to hang vertically at any rotational position of the steering wheel rim 12.

Figure 4:
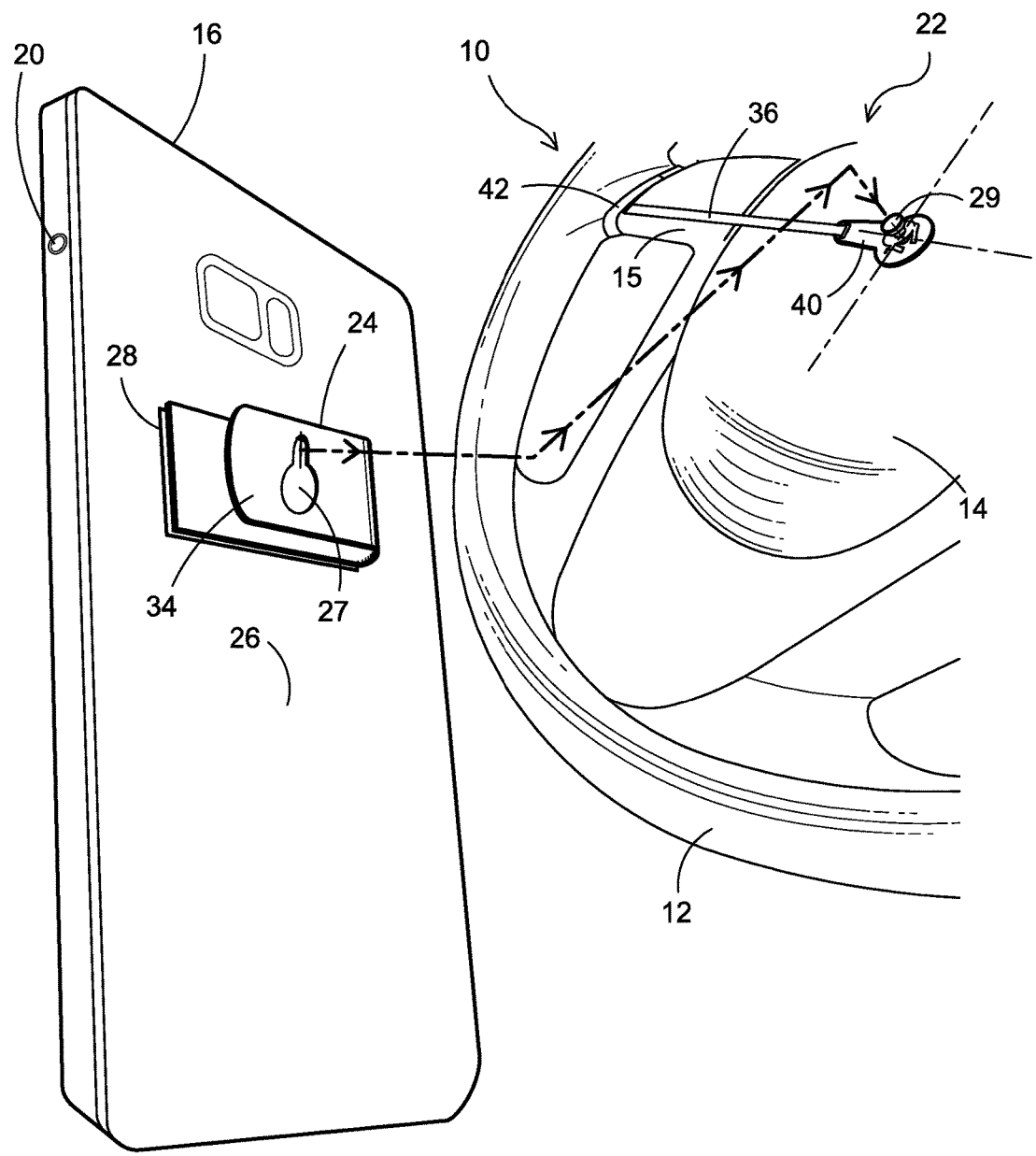
FIG. 4 is an exploded perspective view of FIG. 1

FIG. 4 is an exploded view and illustrates the steering wheel rim 12, center hub 14 and a rear view of the cell phone device 16 having a mounting clip 24 attached to a rear wall 26 of the cell phone 16 or a protective housing or cover therefor. The clip 24 may be attached in a conventional manner by adhesive or using a double sided adhesive strip 28. A centrally located mounting stud 29 is attached to the hub 14 also in a conventional manner by adhesive and/or double face adhesive tape (not shown).

The mounting stud 29, attached to the center hub 14 of the steering wheel assembly 10, positions the cell phone device 16 in close proximity to the driver. The mounting stud 29 is a smooth, cylindrical member with an enlarged head at the upper end thereof. The mounting clip 24 is formed with a generally inverted U-shape and includes a keyhole-shaped opening 27 on an outside leg 34 of the dip 24 to engage and be rotatably supported by the mounting stud 29. Preferably the longest axis of the opening 27 is perpendicular to the longitudinal axis of the clip 24 enabling the cell phone 18 to hang freely.

A safety strap 36 is attached between the steering wheel rim 12 and the mounting stud 29 to maintain the cell phone device 16 in place in the event of a sudden movement or deployment of the airbag under the steering wheel assembly center hub 14. A first end portion 38 of the safety strap 36 is connected to the mounting stud 29, as shown in detail in FIG. 4, by looping the safety strap 36 through the opening 50 of the strap connection tab/base 40 coupled to the mounting stud 29. A second portion of the strap 42 is preferably wrapped, preferably using a hook and loop separable fastener, around a spoke 15 adjacent the steering wheel rim 12 of the steering wheel assembly 10 in a loop or directly to the steering wheel rim 12 and may be adjusted using a conventional connector or formed of a hook and loop separable fastener or the like (not shown). The safety strap 36 is flexible and is made of high strength material such as nylon or similar high strength plastic or metal and limits the length the cell phone 16 and mounting assembly 22 can travel toward the driver by the length of the strap 38 in the event of airbag deployment.

Figure 5:
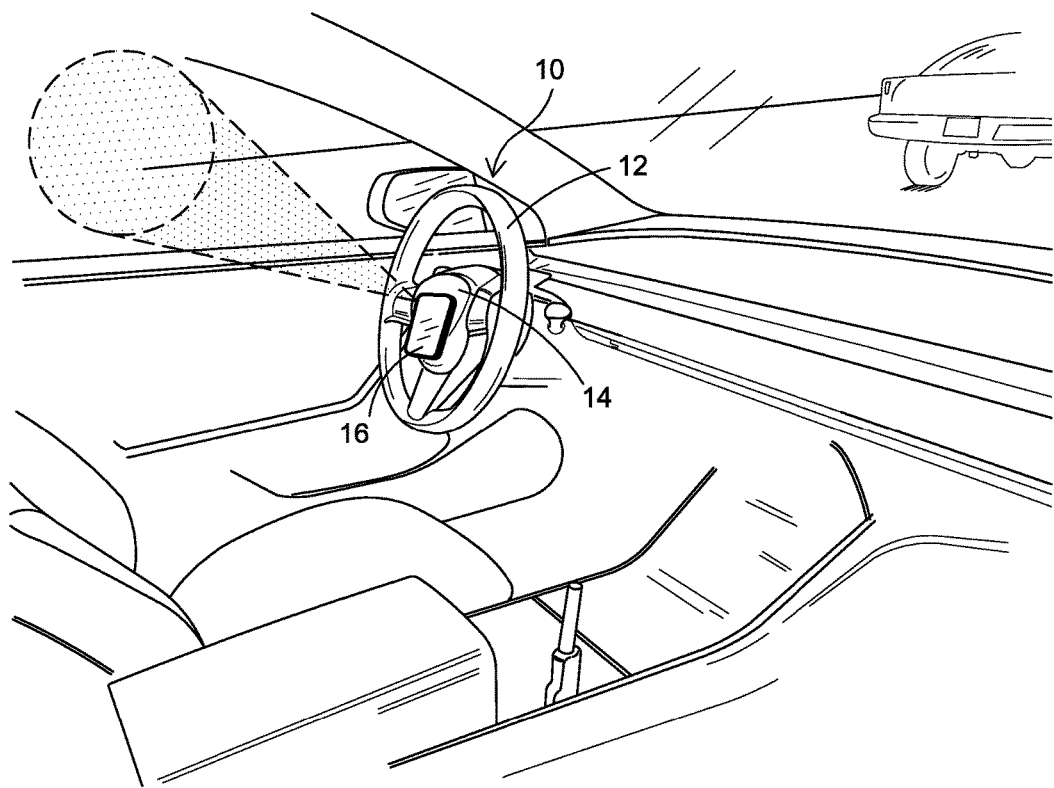
FIG. 5 is a perspective view of FIG. 1 including a field of view of a side camera mounted on the cell phone.
Figure 6:
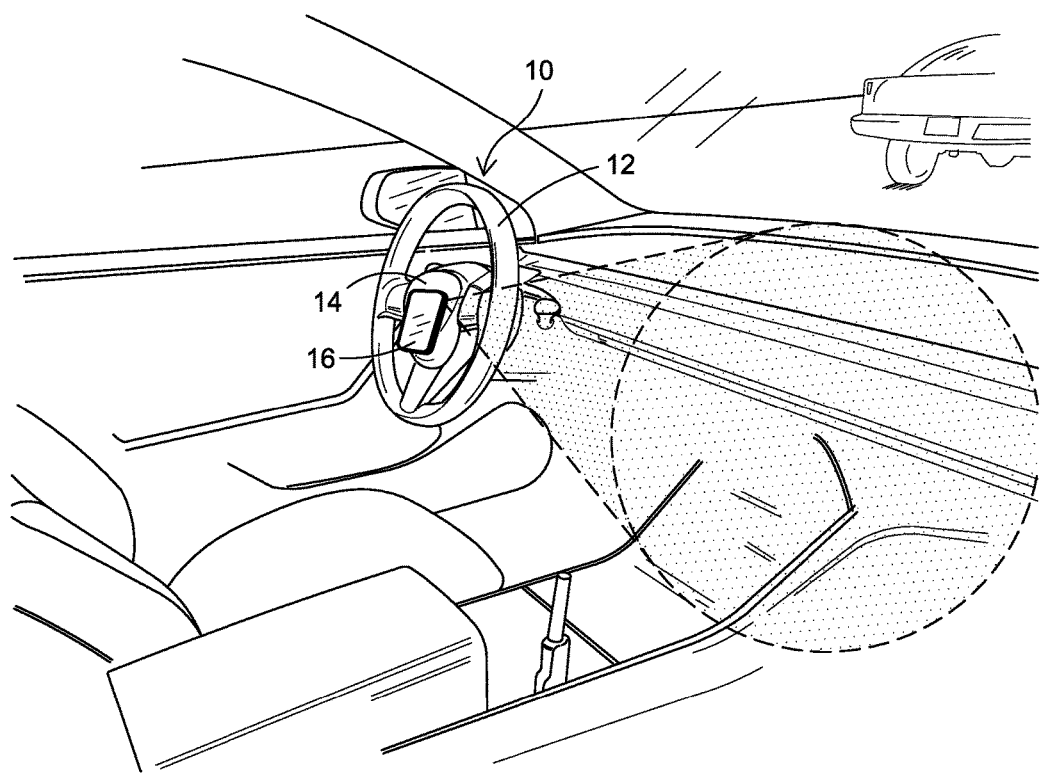
FIG. 6 is a perspective view of FIG. 1 including a passenger side field of view of a side camera mounted on the cell phone.
Figure 7:
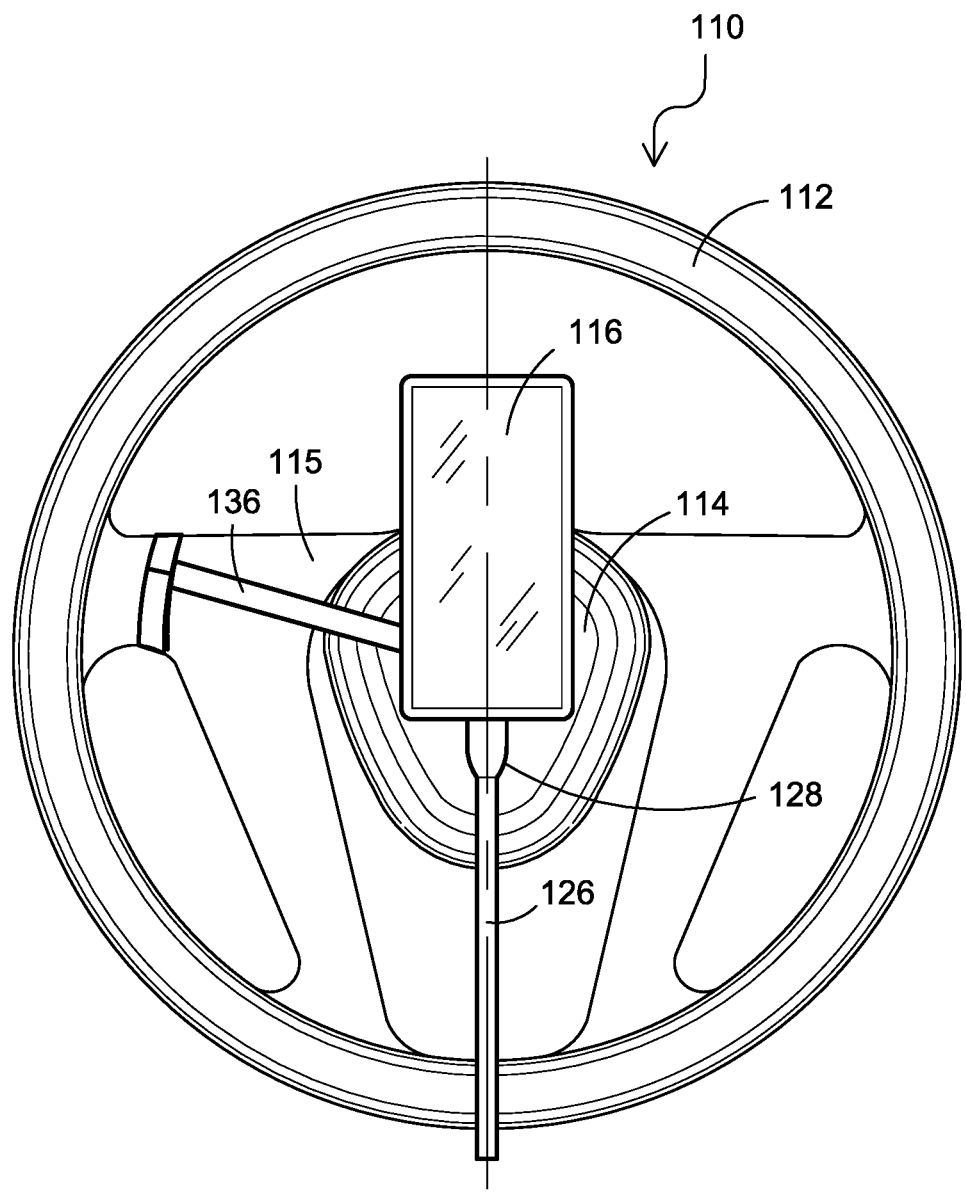
FIG. 7 is a frontal view of an alternate arrangement of a cell phone device mounted on a steering wheel assembly.

FIG. 5 illustrates a conical configuration area representing a driver's side camera field of view. FIG. 6 illustrates a conical configuration area representing a passenger side camera field of view respectively.

It will be appreciated that the driver of the vehicle may activate either camera 18 or 20 or both while the cell phone 16 remains in position attached to the steering wheel assembly 10.

FIGS. 7 to 13 illustrate a second embodiment of the invention including the combination of a conventional steering wheel assembly 110 with a steering wheel rim 112 and center hub 114 and a cell phone type electronic device 116 having a side mounted camera 120 facing the passenger side front window and another camera (not shown) on an opposite side of the cell phone 116 facing the driver side front window so that activity inside and outside of the vehicle may be recorded while the ceil phone 116 is mounted on the steering wheel center hub 114 without the necessity of the cell phone 116 being hand held by the vehicle driver.

The near wall 126 of the cell phone 115 is provided with a mounting clip 124 formed with as generally inverted U-shape and includes a keyhole-shaped opening 127 to engage and be rotatably supported by a mounting stud 129 in the same manner as described with respect to the first embodiment hereinabove.

Figure 8:
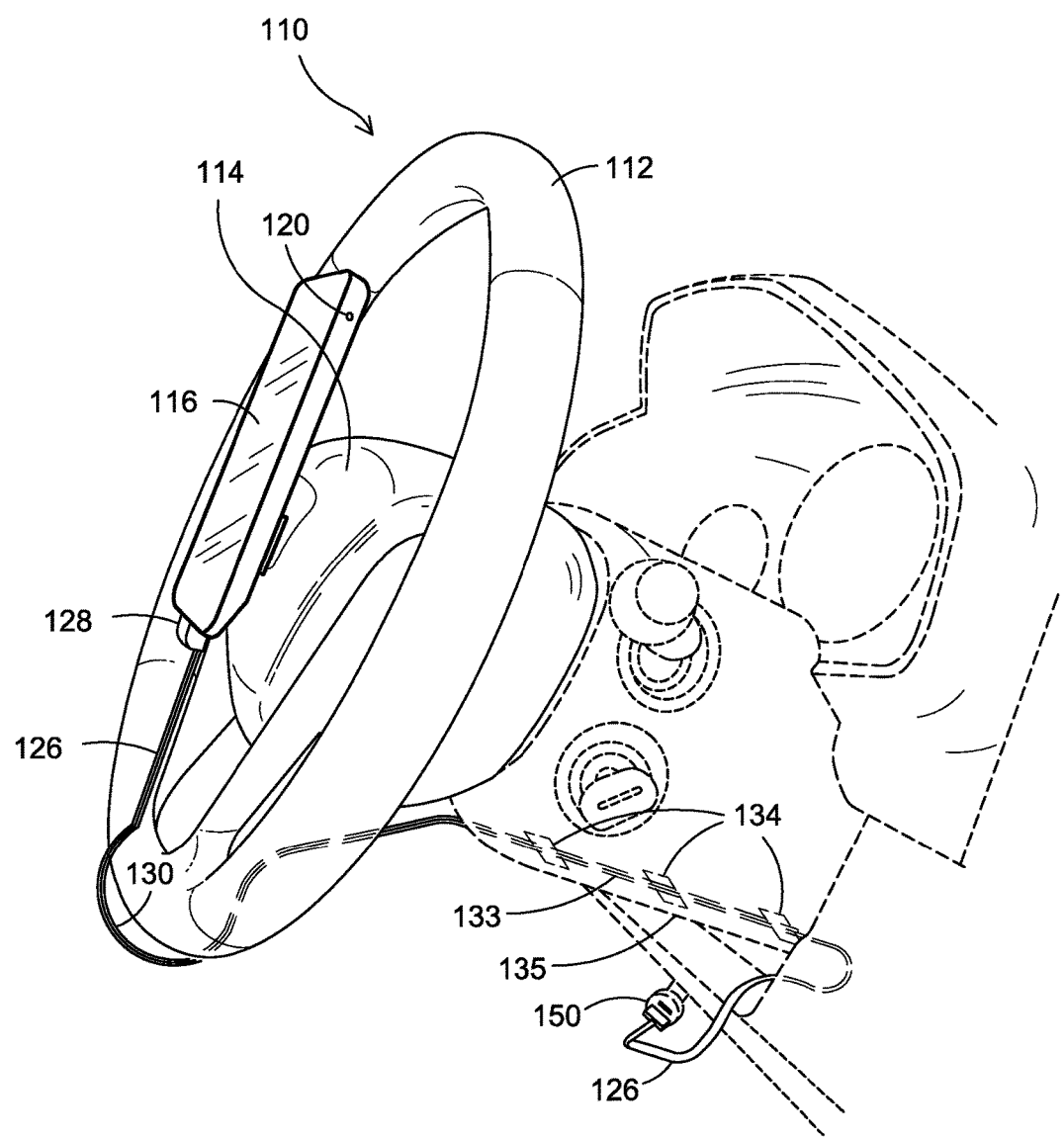
FIG. 8 is a side perspective view of FIG. 7.
Figure 9:
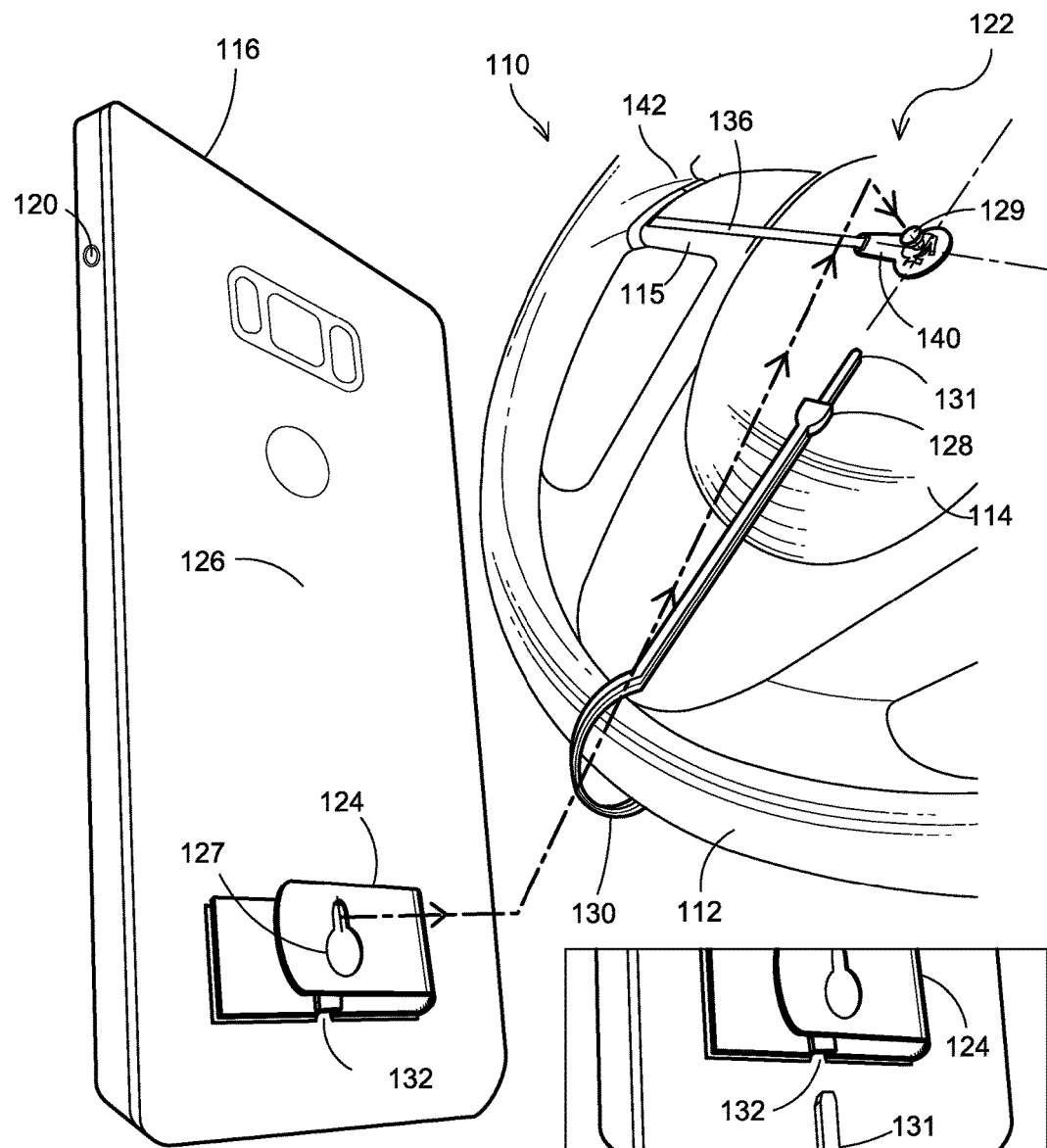
FIG. 9 is an exploded view of FIG. 7.
Figure 9A:
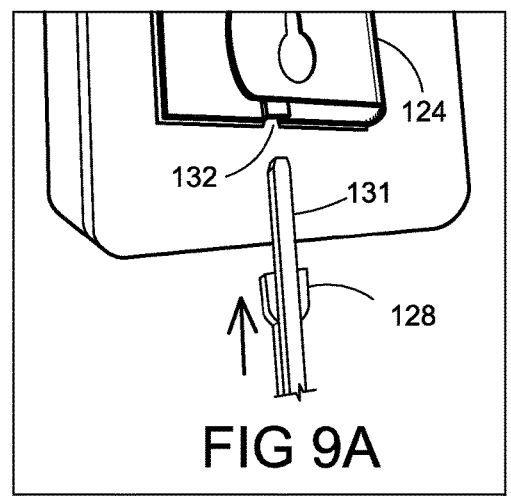
FIG. 9A is a detail of FIG. 9 showing the connection of the cell phone support wand.

A safety strap 136 is connected between a mounting stud 129 and a spoke 115 of the steering wheel rim 112. This embodiment includes a stabilizing wand support 130 that connects to the mounting clip 124 as shown in FIG. 9A. The stabilizing wand support 130 preferably is made of a bendable metal such as a length of aluminum that wraps around the steering wheel rim 112 with a fixed end 133 connected to the steering column 135, vehicle frame or wall, as shown in FIG. 8 or other solid part of the interior of the vehicle. A free end 131 of the wand 130 is insertable into a slot 132 in the mounting clip 124 that maintains the cell phone 116 in an upright, fixed position during the rotational movement of the steering wheel rim 112.

In this embodiment the mounting clip 124 is positioned at a lower end of the rear 126 of the cell phone 116. This position of the mounting clip 124 allows the cell phone 116 to be supported in a higher position relative to the steering wheel assembly 110 whereby; 1) it is maintained in the driver's normal field of vision while looking at the road rather than having to look down away from the road while driving to view the cell phone 116 and 2) the resulting elevation of the side facing cameras allows recording at a similar elevation and perspective as the driver's eyes.

A charging cable 126 extends from a conventional vehicle DC source 150 and terminates in a connector 128 that is inserted into a charging port 140 of a conventional cell phone typically located at the bottom edge 142 of the cell phone 116 to charge the cell phone 118 while it is mounted as described above. Preferably the charging cable 126 is also semi-rigid and/or it is connected to the semi-rigid stabilizing wand support 130 whereby it also is bent around the steering wheel rim 112, and connected to the cell phone 116. Both the stabilizing wand support 130 and the charging cable 126 serve to maintain the cell phone 116 in a vertical position relative to the steering wheel assembly 110.

Figure 10:
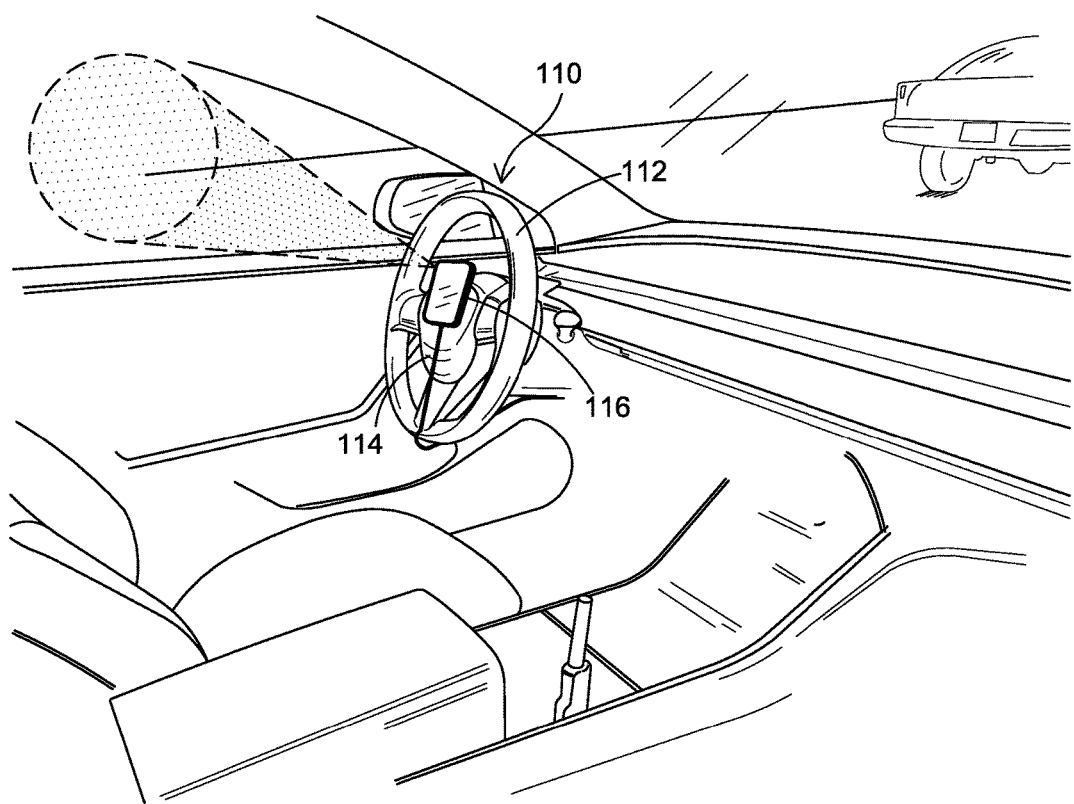
FIG. 10 is a perspective view of FIG. 7 including a driver's side field of view of a side camera mounted on the cell phone.
Figure 11:
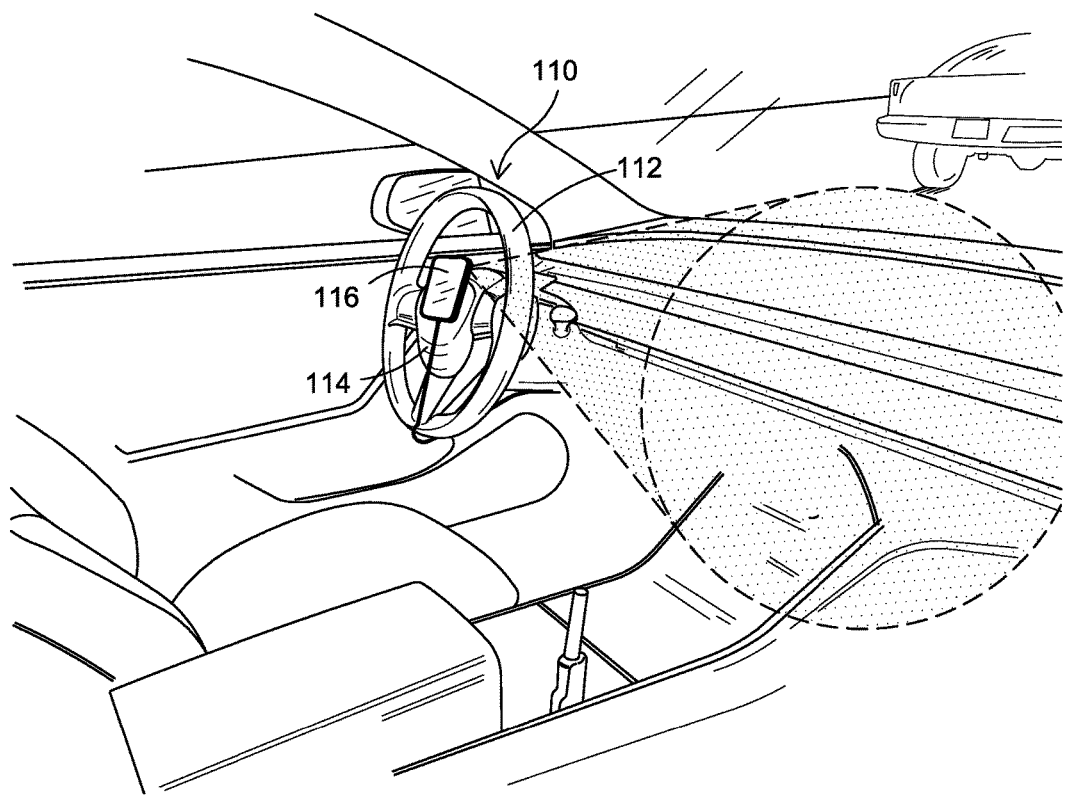
FIG. 11 is a perspective view of FIG. 7 including a passenger's side field of view of a side camera mounted on the cell phone

As with the first embodiment, FIGS. 10 and 11 illustrate conical configuration areas of a driver's side camera field of view and a passenger side camera field of view respectively, however now in a higher position on the steering assembly 10.

Figure 12:
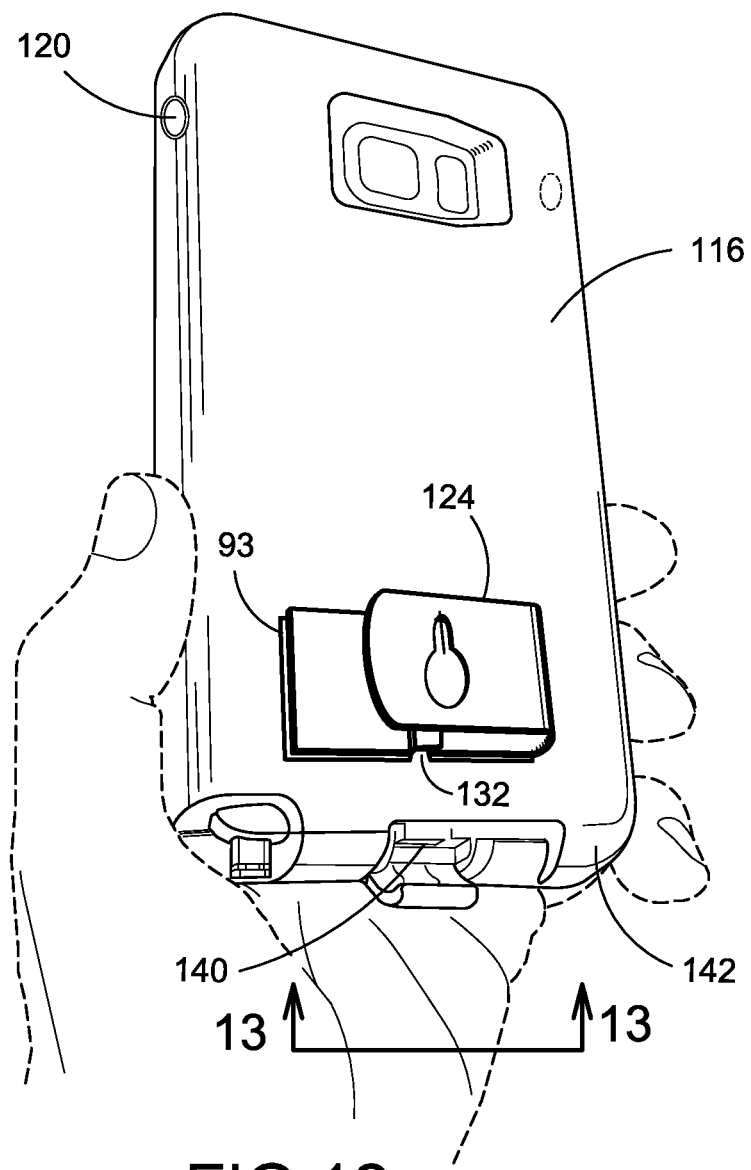
FIG. 12 is a rear perspective view of a cell phone and mounting clip showing connection ports for a charging cable and a support wand.
Figure 13:
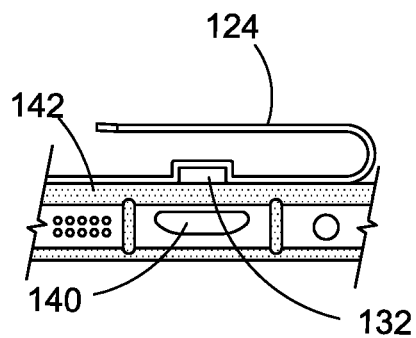
FIG. 13 is an elevational view of the lower end of the cell phone of FIG. 12.

FIGS. 12 and 13 illustrate the cell phone 116 having a cell phone charging pod 140 on a bottom edge 142 of the cell phone 116 that is used to connect the charging cable connector 128. The mounting clip 124 includes a slot 132 for receiving the stabilizing wand support end 131.

In use, both of the above described embodiments function essentially the same. In the event activity is to be recorded, the driver selects which camera, or both are activated by opening a smartphone app that has been programmed to start video recording using one or both of the side facing cameras and uploading this file using the smartphone's connectivity to cloud storage where it is safe from confiscation or tampering with by unauthorized parties.

Modifications and alternate arrangements of the above described invention may be made in keeping within the spirit and scope of the following claims.

The invention claimed is:

1. A combination of a vehicle steering wheel assembly having a steering wheel and a steering column and a cell phone device; comprising:
    a dual mounting apparatus that mounts said cell phone device on said steering wheel and vertically maintains said cell phone device thereon at any rotational position of the steering wheel;
    said cell phone device characterized by having at least one camera positioned and located on an upper half of said cell phone device above a center of rotation of said steering wheel assembly; said camera facing a driver's side window of said vehicle when mounted on said steering wheel assembly;
    said dual mounting apparatus having a first mounting structure including a mounting support located at the center of rotation on said steering wheel and a connector positioned within the lower half of the rear of said cell phone structured to be interconnected with said mounting support on said steering wheel; said first mounting structure maintaining the cell phone in close proximity to the driver with a front face of the cell phone facing the driver as the steering wheel rotates;
    said dual mounting apparatus having a second fixed mounting structure for vertically maintaining said cell phone relative to the steering wheel; said second fixed mounting structure including an elongated support member for supporting said cell phone in a vertical position, said support member having a first fixed end connected to said steering column of the vehicle and a second end connected to said cell phone device at a position below the rotational center of said steering wheel;

whereby said cell phone camera facing the driver's side window is positioned above the rotational center of said steering wheel assembly while said front face of the cell phone remains within a driver's field of view of the road.

2. The combination of claim 1 further defined by said mounting support being a mounting stud centrally located on said steering wheel assembly; and said connector defined as a mounting clip attached on the rear lower half of said electronic cell phone device; said mounting clip having an opening for engagement with said mounting stud; said mounting stud characterized by being freely rotationally movable as the steering wheel rotates as said mounting clip remains fixed on said cell phone device whereby at least the upper half of said cell phone device is maintained in a vertical position above the rotational center of the steering wheel at any rotational position of the steering wheel.

3. The combination of claim 2 wherein said mounting stud is formed with a head and a smaller cylindrical shaft to maintain said mounting clip on said mounting stud; said mounting clip being formed with a dual opening structure to accommodate said mounting stud including a first opening to accommodate said mounting stud head of said mounting stud and a second opening smaller than said first opening to accommodate said cylindrical shaft of said mounting stud.

4. The combination of claim 3 wherein said second opening is adjacent said first opening such that said cylindrical shaft rests and is freely rotatable in said second opening when said mounting clip of said device engages said mounting stud.

5. The combination of claim 1 wherein said cell phone is equipped with multiple cameras including at least one on a first side of said cell phone facing a driver side window and a second camera on an opposite second side of said cell phone facing a passenger side window when said cell phone is mounted on said steering wheel assembly.

6. The combination of claim 1 further including a single safety strap to maintain said cell phone device connected to said steering wheel assembly; said strap having a first portion attached to said mounting apparatus and a second portion attached to said steering wheel; whereby said cell phone remains tethered in the event of air bag deployment.

7. In combination with a vehicle comprising:
a vehicle steering wheel assembly, including a steering wheel and a steering column;
an electronic cell phone device having at least one driver's side front window facing camera positioned on the upper half of said cell phone;
a dual mounting apparatus that enables said cell phone device to be mounted on said steering wheel assembly and maintained thereon in a vertical position at any rotational position of the steering wheel;
said dual mounting apparatus having a first mounting structure allowing the steering wheel to rotate while maintaining the cell phone in a vertical orientation relative to the steering wheel; said first mounting structure including a stud located on a center of rotation of said steering wheel assembly; a mounting clip fixedly attached within the lower rear half of said electronic cell phone device; said mounting clip having a structure for attachment to said mounting stud; said mounting stud characterized by being freely rotatable within said mounting clip whereby at least the upper half of said cell phone device is maintained in a vertical position above the rotational center of the steering wheel regardless of the rotary position of the steering wheel;

said dual mounting apparatus having a second fixed mounting structure for maintaining said cell phone in a vertical position relative to the steering wheel; said second fixed mounting structure including an elongated support member for supporting said cell phone in a vertical position, said support member having a fixed end connected to said steering column of the vehicle and a free end connected below the rotational center of said steering wheel to a lower rear half of said cell phone, whereby the upper half of said cell phone is positioned above the rotational center of said steering wheel assembly in a driver's field of view of the road; and, said camera on said cell phone device characterized by being positioned facing the front drivers' side window of said vehicle when mounted on said steering wheel assembly.

8. The combination of claim 7 wherein said elongated support member is routed along said steering column and over a lower portion of the steering wheel and wherein said free end of said elongated support member attaches to said mounting clip on said cell phone.

9. The combination of claim 8 further including a cell phone charging cable integrally attached to said support member.

10. The combination of claim 7 wherein said elongated support member is rigid when connected between said cell phone and said steering column preventing movement of said cell phone during rotation of the steering wheel.

11. The combination of claim 7 further including a safety strap to maintain said cell phone device connected to said steering wheel assembly; said strap having a first portion attached to said first mounting structure and a second portion attached to said steering wheel; whereby said cell phone remains tethered in the event of an airbag deployment.

12. A method of capturing and preserving video evidence inside and outside a motor vehicle comprising:
mounting a cell phone with a camera on a steering wheel assembly of the vehicle having a steering wheel and a steering column;
positioning said cell phone so that at least an upper half of said cell phone is above a rotational center of the steering wheel;
positioning said camera on an upper half of said cell phone and facing said camera toward a driver's side front window with a front of said cell phone facing the driver in the driver's frontal view;
maintaining said cell phone in a vertical position at any rotational position of the steering wheel;
initiating a preprogrammed video recording app contained within said cell phone;
recording activity that transpires viewable through or in the direction of the driver's front side window;
and, automatically uploading the recorded evidence to the cloud such that it can be accessed only by authorized individuals.

13. The method of claim 12 being further defined by said recorded evidence being produced during a law enforcement vehicle stop.

14. The method of claim 12 further including the step of securing the cell phone to the steering wheel assembly to limit movement thereof in the event of an airbag deployment.

15. The method of claim 12 wherein the step of maintaining said cell phone in a vertical position at any rotational position of the steering wheel further includes the steps of attaching said cell phone to a first mounting structure located at the rotational center of the steering wheel assembly with a complimentary mounting structure attached to the back of said cell phone at a location within a lower rear half of said cell phone whereby said first mounting structure is freely rotatable relative to said complimentary mounting structure;

and, connecting said cell phone to the steering column with a fixed elongated support member maintaining the cell phone in a vertical orientation relative to the steering wheel assembly; to maintain the cell phone in a fixed, vertical position during movement of the steering wheel; whereby at least the upper half of said cell phone is positioned at a higher elevation than the rotational center of the steering wheel within a driver's field of view of the road while driving thereon.

* * * * *